US012769383B2

(12) United States Patent
Ito

(10) Patent No.: US 12,769,383 B2
(45) Date of Patent: Oct. 20, 2026

(54) POWER EFFICIENCY CALCULATION DEVICE, POWER EFFICIENCY CALCULATION METHOD, POWER EFFICIENCY CALCULATION SYSTEM, AND PROGRAM

(71) Applicant: NTT, Inc., Tokyo (JP)

(72) Inventor: Yoshito Ito, Musashino (JP)

(73) Assignee: NTT, Inc., Tokyo (JP)

( * ) Notice: Subject to any disclaimer, the term of this patent is extended or adjusted under 35 U.S.C. 154(b) by 142 days.

(21) Appl. No.: 18/866,852

(22) PCT Filed: May 26, 2022

(86) PCT No.: PCT/JP2022/021618
§ 371 (c)(1),
(2) Date: Nov. 18, 2024

(87) PCT Pub. No.: WO2023/228376
PCT Pub. Date: Nov. 30, 2023

(65) Prior Publication Data
US 2025/0355479 A1 Nov. 20, 2025

(51) Int. Cl.
*G06F 1/3206* (2019.01)

(52) U.S. Cl.
CPC .................................. *G06F 1/3206* (2013.01)

(58) Field of Classification Search
CPC .................................................... G06F 1/3206
USPC ......................................................... 713/320
See application file for complete search history.

(56) References Cited

U.S. PATENT DOCUMENTS 5,212,441 A * 5/1993 McEachern .......... G01R 21/006 324/141
5,675,503 A * 10/1997 Moe .......................... H02J 3/14 307/32
8,484,340 B2 * 7/2013 Hogan .................... H04L 41/22 709/224
9,092,219 B2 * 7/2015 Naffziger ......... G01R 31/31721
11,281,279 B2 * 3/2022 Sodhi .................... G06F 1/3206
2010/0281286 A1 * 11/2010 Hatasaki ............... G06F 1/3203 713/324

(Continued)

OTHER PUBLICATIONS

Anderson et al., "A Framework for Data Center Energy Productivity," The Green Grid, White Paper #13, 2008, 16 pages.

(Continued)

*Primary Examiner* — Paul R. Myers
(74) *Attorney, Agent, or Firm* — Fish & Richardson P.C.

(57) ABSTRACT

A power efficiency calculation device includes: a metrics collection unit that collects metrics from a physical server group; a metrics measurement interval determination unit that extracts a change in a task execution amount in a predetermined time interval as a frequency component, and determines a metrics measurement interval; a power efficiency calculation interval determination unit that determines, as a power efficiency calculation interval, an interval that is equal to or greater than the metrics measurement interval and equal to or less than a minimum executable interval; and a power efficiency calculation unit that calculates the power efficiency in the determined power efficiency calculation interval using the metrics collected in the determined metrics measurement interval.

5 Claims, 5 Drawing Sheets

(56) References Cited

U.S. PATENT DOCUMENTS

| | | | | |
|---|---|---|---|---|
| 2011/0092164 | A1* | 4/2011 | Spanhake | H04Q 9/00<br>455/67.11 |
| 2013/0198576 | A1* | 8/2013 | Ikegami | G06F 1/3203<br>714/48 |
| 2015/0051749 | A1* | 2/2015 | Hancock | G01R 21/1331<br>700/295 |
| 2017/0255239 | A1* | 9/2017 | Matteson | G06F 1/3209 |
| 2020/0341039 | A1* | 10/2020 | Ungureanu | G01R 19/2513 |
| 2023/0176557 | A1* | 6/2023 | Cella | G05B 19/41885<br>700/117 |
| 2024/0135174 | A1* | 4/2024 | Zhou | G06N 3/04 |

OTHER PUBLICATIONS

GitHub.com [online], “Remote IPMI exporter for Prometheus,” Oct. 2019, retrieved on Sep. 2024, retrieved from URL<https://github.com/prometheus-community/ipmi_exporter>, 12 pages.

Grishina et al., “DC Energy Data Measurement and Analysis for Productivity and Waste Energy Assessment,” 21st IEEE International Conference on Computational Science and Engineering, Oct. 29-31, 2018, Bucharest, Romania, 12 pages.

Sego et al., “Implementing the Data Center Energy Productivity Metric,” ACM Journal on Emerging Technologies in Computing Systems, Oct. 2012, 8(4):30, 22 pages.

* cited by examiner

POWER EFFICIENCY CALCULATION DEVICE, POWER EFFICIENCY CALCULATION METHOD, POWER EFFICIENCY CALCULATION SYSTEM, AND PROGRAM

CROSS-REFERENCE TO RELATED APPLICATIONS

This application is a National Stage application under 35 U.S.C. § 371 of International Application No. PCT/JP2022/021618, having an International Filing Date of May 26, 2022. The disclosure of the prior application is considered part of the disclosure of this application, and is incorporated by reference in its entirety into this application.

TECHNICAL FIELD

The present invention relates to a power efficiency calculation device, a power efficiency calculation method, a power efficiency calculation system, and a program, for calculating power efficiency for application processing.

BACKGROUND ART

Various definitions have been proposed for a power efficiency index of a data center. Among them, the only index which can be measured and calculated in real time as to with what degree of power efficiency a specific application can be operated is Data Center energy Productivity (DCeP) (refer to NPL 1). DCeP is defined in Equation (1) below.

[Math. 1]

$$DCeP = \frac{\text{Useful Work Produced}}{\text{Total Engery Consumed to Perform that Work}} \quad \text{Equation (1)}$$

DCeP (power efficiency) is defined as a "useful work produced" (referred to herein as "work output") divided by "total energy consumed to perform that work" (referred to herein as "power consumption").

Further, the "useful work produced" (work output) is defined by the following Equation (2).

[Math. 2]

$$UsefuleWork\ \text{Produced} = \sum_{i=1}^{M} V_i * U_i(t, T) * T_i \quad \text{Equation (2)}$$

Here, "M" denotes the number of tasks started in an assessment window, "$V_i$" denotes a normalization coefficient obtained by summing up numerical values of the tasks, "$U_i$ (t, T)" denotes a time-based utility function of each task, "t" denotes an elapsed time from start to completion of the task, and "T" denotes an absolute time at task completion.

NPL 1 proposes setting a weight coefficient for a task for "useful work produced" (work output) and adjusting balance of values among the tasks. However, NPL 1 fails to mention of a specific method for adjusting the balance. Further, NPL 1 only describes "an interval of 20 times or more of task execution is desirable" for the assessment window which is a measurement interval.

Further, NPL 2 describes results of calculating DCeP with "useful work produced" (work output) defined as energy consumed when various applications are processed in a high performance computing (HPC) data center. However, in NPL 2, all tasks are handled equivalently without considering a weight for each application type or importance of processing between tasks. In addition, the DCeP (power efficiency) calculation interval is set to one hour.

NPL 3 defines "useful work produced" (work output) as the number of times by which two types of applications are executed within a certain period of time (useful computational units), and the number of executions when each application has been executed with a weight coefficient (1:0.08) is normalized. In addition, an execution completion time of a specific application is set as the DCeP (power efficiency) calculation interval.

Here, it is assumed that, regarding actual measurement values of the "useful work produced" (work output) and the "total energy consumed to perform that work" (power consumption amount) shown in Equation (1), metrics that are assessment indexes for performance and the like are acquired from a system ("physical server group 30" described below) using metrics collection software (resource monitoring software). Prometheus, which is one of the de facto standards of metrics collection software, defines a default value (scrape interval) for metrics collection as one minute (refer to NPL 4).

This Prometheus requires users to set the measurement interval appropriately according to their own needs, but fails to provide clear guidelines on what value to set.

CITATION LIST

Non Patent Literature

[NPL 1] D. Anderson, et al., "A framework for data center energy productivity", The Green Grid, 2008.

[NPL 2] A. Grishina, et al., "DC energy data measurement and analysis for productivity and waste energy assessment", 2018 IEEE International Conference on Computational Science and Engineering (CSE), IEEE, 2018.

[NPL 3] Landon H. Sego, et al., "Implementing the data center energy productivity metric", ACM Journal on Emerging Technologies in Computing Systems (JETC) 8.4 (2012): 1-22.

[NPL 4] Prometheus Authors 2014-2022, "Prometheus," The Linux Foundation, 2022, [online], [Retrieved on May 9, 2022], Internet <URL: https://prometheus.io/docs/prometheus/latest/configuration/configuration/>

SUMMARY OF INVENTION

Technical Problem

When calculating DCeP (power efficiency), the following problem occurs if the frequency of metrics measurement necessary for calculating DCeP (power efficiency) and the frequency of calculation of DCeP (power efficiency) are not appropriately set.

If the frequency of metrics measurement and the frequency of calculation of DCeP (power efficiency) are too high, not only does the power efficiency value become unstable due to the effects of small changes, but it also leads to wasteful power consumption and storage capacity shortage associated with measurements and calculations. Conversely, if the frequency of metrics measurement and the frequency of calculation of DCeP (power efficiency) are too low, changes in demand fluctuations cannot be observed.

The diagram indicated by reference numeral 51 in FIG. 5 shows an example in which the frequency of metrics measurement and the frequency of calculation of DCeP (power efficiency) are appropriately set. The horizontal axis represents time [h], and the vertical axis shown in a histogram represents task throughput [a.u.] (arbitrary unit) such as data transfer amount or power [W]. Further, the vertical axis shown in the line graph represents power efficiency [a.u.], and indicates that calculation of DCeP (power efficiency) is performed six times (indicated by circles) in a predetermined period.

As shown by reference numeral 51 in FIG. 5, in reality, even for applications with severe demand fluctuations, if the measurement frequency of metrics measurement is too low, as shown by reference numeral 52 in FIG. 5, the task throughput and power are smoothed, and their changes are overlooked. Conversely, as shown by reference numeral 53 in FIG. 5, if the frequency of calculation of DCeP (power efficiency) is too low (three times in a predetermined period), the sensitivity to changes in power efficiency becomes low, and opportunities for control are lost.

The present invention has been made in view of these problems, and an object of the present invention is to appropriately determine a measurement interval of metrics and a calculation interval of power efficiency in accordance with demand fluctuations related to application use.

Solution to Problem

A power efficiency calculation device according to the present invention is a power efficiency calculation device for calculating power efficiency by executing an application installed on a physical server group, the power efficiency calculation device including: a metrics collection unit configured to collect metrics from the physical server group, the metrics being an assessment index necessary for power efficiency calculation and including a task execution amount and power consumption of the physical server group, and to store the metrics in a metrics collection DB in a storage unit; a metrics measurement interval determination unit configured to acquire the task execution amount stored in the metrics collection DB, to extract a change in the task execution amount in a predetermined time interval as a frequency component, and to determine a metrics measurement interval using the extracted frequency; a power efficiency calculation interval determination unit configured to determine, as a power efficiency calculation interval, an interval that is equal to or greater than the determined metrics measurement interval and equal to or less than a minimum executable interval indicating a time from start to completion of power efficiency control; and a power efficiency calculation unit configured to calculate the power efficiency in the power efficiency calculation interval determined by the power efficiency calculation interval determination unit using the metrics collected by the metrics collection unit in the determined metrics measurement interval.

Advantageous Effects of Invention

According to the present invention, it is possible to appropriately determine a measurement interval of metrics and a calculation interval of power efficiency in accordance with demand fluctuations related to application use.

DESCRIPTION OF EMBODIMENTS next, a mode for carrying out the present invention (hereinafter referred to as "the present embodiment") is described.

Figure 1:
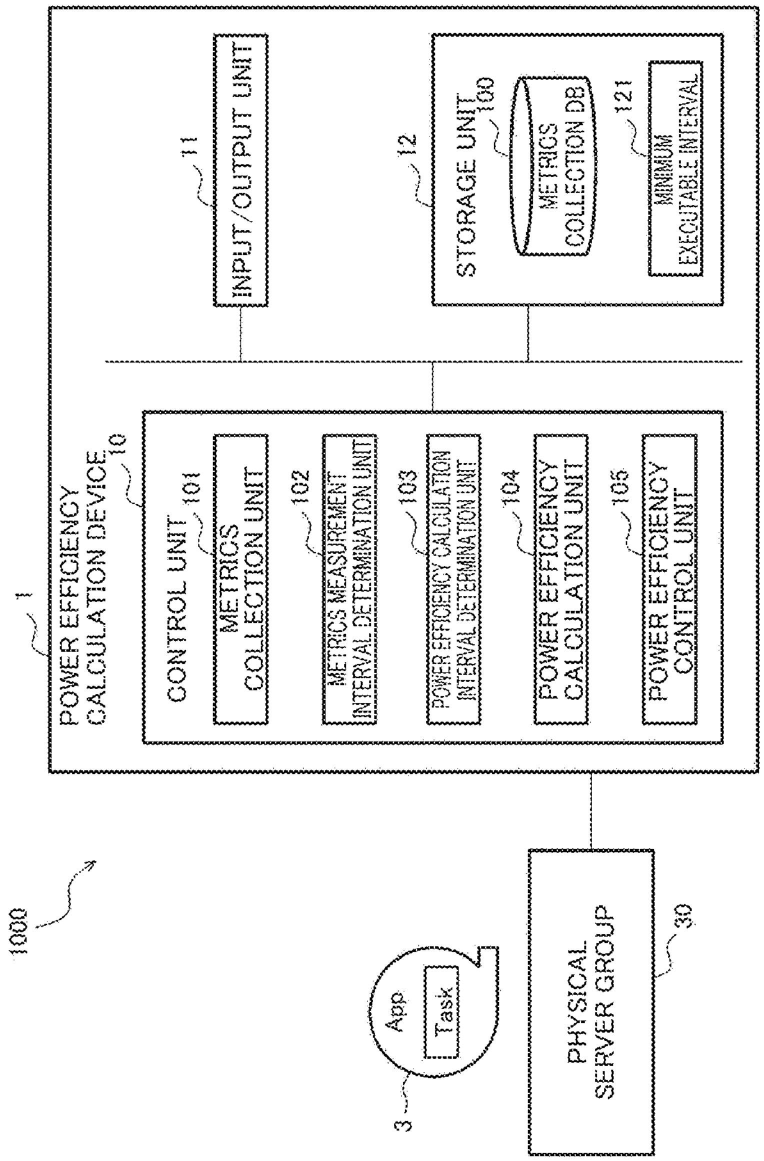
FIG. 1 is a diagram illustrating an overall configuration of a power efficiency calculation system including a power efficiency calculation device according to an embodiment.

FIG. 1 is a diagram illustrating an overall configuration of a power efficiency calculation system 1000 including a power efficiency calculation device 1 according to the present embodiment.

The power efficiency calculation system 1000 includes, for example, a physical server group 30 configured by a data center or the like, and the power efficiency calculation device 1 communicatively connected to a physical server group 30.

The physical server group 30, for example, is operated with a virtualization infrastructure constructed on physical servers, and one or more applications 3 are installed in a virtual machine (VM) or a container on a virtual OS to execute processing. Each application 3 implements a service by executing one or more tasks.

The power efficiency calculation device 1 collects metrics ("task execution amount," "power consumption," etc. described later) that are assessment indexes necessary for calculating DCeP (power efficiency) from the physical server group 30, and determines optimal metrics measurement intervals and power efficiency calculation intervals at which changes in demand processed by the application 3 (corresponding to changes in the task execution amount of the application 3) can be captured. Then, the power efficiency calculation device 1 performs metrics measurement and power efficiency calculation at the determined metrics measurement interval and power efficiency calculation interval.

This allows the power efficiency calculation device 1 to suppress power wastage and storage shortage caused by performing metrics collection processing and power efficiency calculation processing at excessive frequency, and to appropriately assess demand fluctuations of target applications.

Next, the power efficiency calculation device 1 is described in detail.

As illustrated in FIG. 1, the power efficiency calculation device 1 includes a control unit 10, an input/output unit 11, and a storage unit 12.

The input/output unit 11 inputs or outputs information to or from, for example, each server in the physical server group 30. The input/output unit 11 includes a communication interface for performing information transmission or reception via a communication line, and an input/output interface for performing information input or output to and from an input device such as a keyboard and an output device such as a monitor (not illustrated).

The storage unit 12 includes a hard disk, a flash memory, a random access memory (RAM), and the like.

The storage unit 12 temporarily stores a program for causing functions of the control unit 10 to be executed or information that is necessary for processing of the control unit 10. Further, a metrics collection database (DB) 100 of the storage unit 12 stores metrics necessary for calculation of DCeP (power efficiency) that are collected from each physical server in the physical server group 30, a virtual OS (OS), a VM, a container, an application, or the like. Furthermore, the storage unit 12 stores information on the minimum executable interval ($T_c^{min}$) used when determining the interval for power efficiency calculation (Assessment window). Details of the minimum executable interval ($T_c^{min}$) is described below The control unit 10 controls the overall processing executed by the power efficiency calculation device 1, and as illustrated in FIG. 1, includes a metrics collection unit 101, a metrics measurement interval determination unit 102, a power efficiency calculation interval determination unit 103, a power efficiency calculation unit 104, and a power efficiency control unit 105.

The metrics collection unit 101 collects metrics (assessment indexes such as performance) necessary for power efficiency calculation from the physical server group 30 and stores the metrics in the metrics collection DB 100.

The metrics collection unit 101 collects metrics from a physical server, an OS (virtual OS), a VM/container, an application, or the like constituting the physical server group 30 by using existing resource monitoring software (for example, Prometheus, etc.).

For example, the metrics collection unit 101 collects information on the task execution amount (the number of requests processed by an application, the data transfer amount, and the like) and power consumption [W] as metrics from the physical server group 30, and stores the information in the metrics collection DB 100.

Note that the metrics collection unit 101 collects the metrics from the physical server group 30 in advance before calculating the DCeP (power efficiency), which is "preliminary preparation stage" described below, and also collects metrics when calculating the DCeP (power efficiency), which is described below as an "operation stage".

The metrics measurement interval determination unit 102 extracts the application demand fluctuation (change in the task execution amount) in a predetermined time interval as a frequency component on the basis of the task execution amount collected by the metrics collection unit 101, and determines metrics measurement intervals using the extracted frequencies.

Specifically, the metrics measurement interval determination unit 102 acquires the actual measurement value (demand fluctuations for the application) of the task throughput (number of requests to the application, data transfer amount, and the like) for a predetermined period from the metrics collection DB 100, and executes smoothing (moving average or the like) on the actual measurement value of the task throughput.

Then, the metrics measurement interval determination unit 102 divides the smoothed data by a predetermined time interval and extracts frequency components in each time interval. The metrics measurement interval determination unit 102 acquires the maximum frequency $\lambda_l$ (target frequency) among the extracted frequencies.

Figure 2:
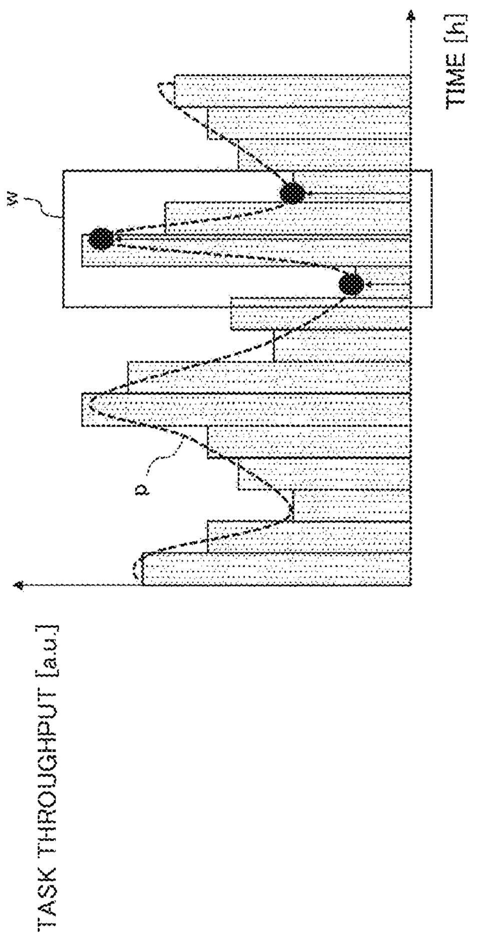
FIG. 2 is a diagram illustrating an example in which frequency components are extracted in predetermined time intervals from data obtained by smoothing task throughput.

FIG. 2 is a diagram illustrating an example in which frequency components are extracted for each window w of a predetermined time interval from data (graph indicated by dotted line p in FIG. 2) that has been undergone smoothing (moving average or the like) regarding the task throughput shown in a histogram.

The metrics measurement interval determination unit 102 acquires the maximum (highest) frequency $\lambda_l$ (target frequency) among the frequency components extracted in each predetermined time interval (window w).

Then, the metrics measurement interval determination unit 102 selects a frequency $\lambda_M$ that is greater than twice the target frequency $\lambda_l$ on the basis of the sampling theorem, and determines a metrics measurement interval ($T_M$) on the basis of the selected frequency $\lambda_M=1/T_M$. Note that when selecting a frequency $\lambda_M$ that is greater than twice the target frequency $\lambda_l$, the metrics measurement interval determination unit 102 presets a predetermined logic (for example, a logic that sets the target frequency to a predetermined multiple (for example, 2.5 times) greater than twice the target frequency $\lambda_l$) for determining a frequency that is closer to twice the target frequency $\lambda_l$ among frequencies that are greater than twice the target frequency $\lambda_l$.

Referring back to FIG. 1, the power efficiency calculation interval determination unit 103 determines a power efficiency calculation interval ($T_A$) on the basis of the metrics measurement interval ($T_M$) determined by the metrics measurement interval determination unit 102.

The power efficiency calculation interval determination unit 103 determines the power efficiency calculation interval ($T_A$) using the metrics measurement interval ($T_M$) and the minimum executable interval ($T_c^{min}$).

Here, the minimum executable interval ($T_c^{min}$) means "the time from when execution of control is determined until the control is reflected" when power efficiency control is executed. In other words, the minimum executable interval ($T_c^{min}$) means the time from start to completion of power efficiency control.

For example, this time is from start to completion of an instruction when changing the placement of an application on a container on one physical server to a container on another physical server to control power efficiency, or suspending a physical server with a low operating rate. This minimum executable interval ($T_c^{min}$) 121 (see FIG. 1) is measured in advance and stored in the storage unit 12 before executing the operation stage process.

The power efficiency calculation interval determination unit 103 determines a value satisfying $T_M \leq T_A$ using the metrics measurement interval ($T_M$).

Furthermore, when performing power efficiency control, the power efficiency calculation interval determination unit 103 determines a value satisfying $T_A \leq T_c^{min}$. In other words, a value satisfying $T_M \leq T_A \leq T_c^{min}$ is determined. This makes it possible to determine the upper limit value and the lower limit value of the power efficiency calculation interval ($T_A$).

Here, when $T_c^{min} \leq T_M$, the power efficiency calculation interval ($T_A$) is determined with priority given to the relationship $T_M \leq T_A$.

The technical significance of using the minimum executable interval ($T_c^{min}$) as the upper limit value of the power efficiency calculation interval ($T_A$) is described.

The purpose of power efficiency calculation is to improve power efficiency through some kind of control. In order to maximize power efficiency, it is desirable to detect inefficient states as soon as possible and intervene the states through control. When the power efficiency calculation interval ($T_A$) is greater than the minimum executable interval ($T_c^{min}$), the following two problems occur.

(1) Even though the next control is possible when some kind of control is completed, it is not possible to determine whether the control is necessary or not.

(2) A comparison before and after some kind of control cannot be performed immediately. Furthermore, this makes it difficult to distinguish between control effects and other external factors (such as changes in load).

In order to prevent the above problems from occurring, it is desirable that the power efficiency calculation interval ($T_A$) should be equal to or less than the minimum executable interval ($T_c^{min}$).

The power efficiency calculation unit 104 calculates DCeP (power efficiency) using the metrics collected by the metrics collection unit 101 (for example, the number of requests processed, the data transfer amount, power consumption, and the like).

The power efficiency calculation unit 104 acquires the metrics that are measured by the metrics collection unit 101 at each metrics measurement interval ($T_M$) determined by the metrics measurement interval determination unit 102 and stored in the metrics collection DB 100 at the operation stage. Then, the power efficiency calculation unit 104 calculates "useful work produced" (work output) using the above Equation (2).

Furthermore, the power efficiency calculation unit 104 calculates the total power consumption amount ("total energy consumed to perform that work") consumed by the physical server group 30 in the power efficiency calculation interval ($T_A$) determined by the power efficiency calculation interval determination unit 103. The total power consumption amount consumed by the physical server group 30 is calculated by summing the power consumption collected as metrics by the metrics collection unit 101 at the power efficiency calculation interval ($T_A$) (integration based on the power consumption amount at the power efficiency calculation interval ($T_A$)), and the like. Then, the power efficiency calculation unit 104 calculates power efficiency by dividing the calculated "useful work produced" (work output) by "total energy consumed to perform that work" (power consumption amount) using Equation (1).

The power efficiency control unit 105 executes predetermined power efficiency control according to the power efficiency calculation result calculated by the power efficiency calculation unit 104.

Here, the predetermined power efficiency control is, for example, processing such as moving an application on a server with a low CPU usage rate to another server when power efficiency is decreasing, and controlling the server with a low CPU usage rate to sleep. The content of this predetermined power efficiency control is set in advance according to the calculation result of power efficiency.

<Processing of Power Efficiency Calculation Device>

Next, a flow of processing performed by the power efficiency calculation device 1 is described.

Figure 3:
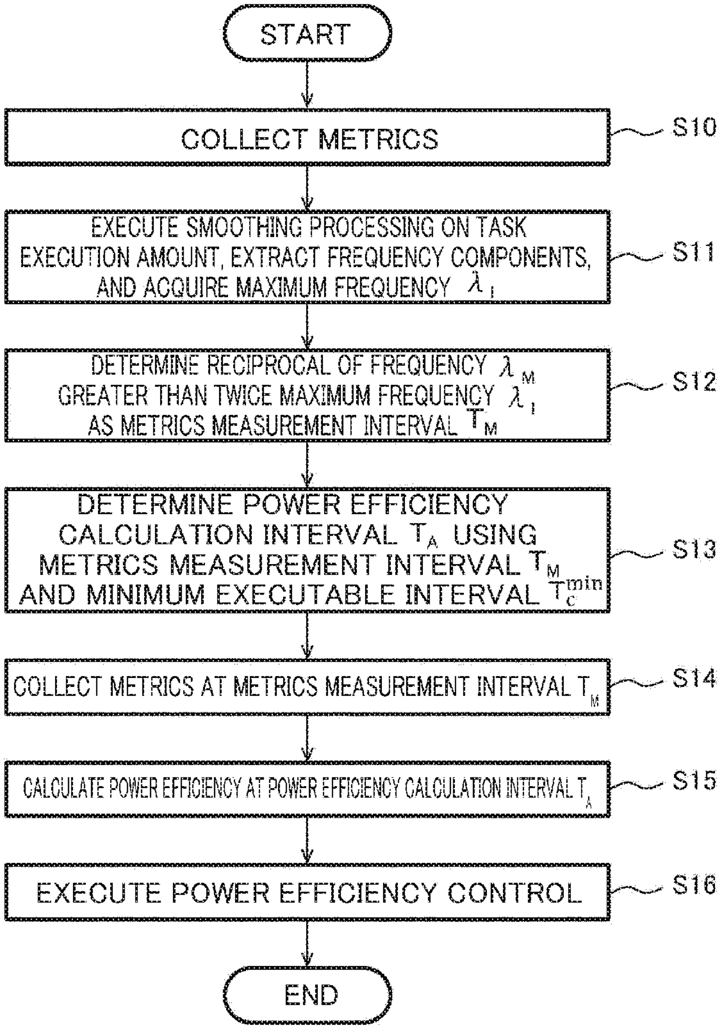
FIG. 3 is a flowchart illustrating a flow of processing executed by the power efficiency calculation device according to the present embodiment.

FIG. 3 is a flowchart illustrating a flow of processing executed by the power efficiency calculation device 1 according to the present embodiment.

The processing executed by the power efficiency calculation device 1 is roughly divided into a preliminary preparation stage and an operation stage. At the preliminary preparation stage, metrics measurement intervals ($T_M$) and power efficiency calculation intervals ($T_A$) are determined using metrics collected in advance from the physical server group 30. Then, at the operation stage, metrics are collected from the physical server group 30 the metrics measurement interval ($T_M$) determined at the preliminary preparation stage, and DCeP (power efficiency) is calculated at each power efficiency calculation interval ($T_A$) using the collected metrics.

Here, it is assumed that the minimum executable interval ($T_c^{min}$) 121 is measured in advance and stored in the storage unit 12 before the operation stage is executed.

Further, as an application example, an example is described in which DCeP (power efficiency) is monitored in an operating environment of a user plane function (UPF) application that transfers user data in packets from a user terminal to a data network (such as the Internet).

First, in the preliminary preparation stage, the metrics collection unit 101 of the power efficiency calculation device 1 collects metrics (assessment indexes such as performance) necessary for power efficiency calculation from the physical server group 30, and stores the metrics in the metrics collection DB 100 (step S10).

The metrics collection unit 101 collects the metrics using, for example, metrics collection software (Prometheus). The collected metrics are, for example, a data transfer amount as a task execution amount and power consumption [W].

Note that the metrics collection unit 101 may collect metrics by, for example, applying a test load to the application 3, or may collect metrics obtained by executing actual request processing, data transfer, or the like.

At this time, the metrics measurement interval by the metrics collection unit 101 is set to, for example, one minute, which is the default value for metrics collection in Prometheus, as a provisional value.

The metrics collection unit 101 collects the task execution amount (data transfer amount) of the UPF application for a predetermined period of one month, for example.

Next, the metrics measurement interval determination unit 102 of the power efficiency calculation device 1 executes smoothing (moving average or the like) which is a ow-pass filter processing, on application demand fluctuations (changes in the task execution amount) on the basis of the task execution amount (data transfer amount or the like) acquired by the metrics collection unit 101. Then, the power efficiency calculation device 1 divides the smoothed data into predetermined time intervals, extracts frequency components at each time interval, and acquires the maximum frequency $\lambda_l$ (target frequency) among the extracted frequencies (step S11).

Specifically, the metrics measurement interval determination unit 102 determines, for example, daily fluctuation (cycle focused on one day) as an order of control cycle, and calculates a moving average over a predetermined time interval (for example, one hour) and executes smoothing on the data transfer amount. Then, the metrics measurement interval determination unit 102 divides the data by one-hour interval with a certain overlapping period (for example, 30 minutes), and extracts frequency components at each time interval. The metrics measurement interval determination unit 102 acquires the maximum frequency Mi (target frequency) among the extracted frequency components.

Next, the metrics measurement interval determination unit 102 obtains a frequency $\lambda_M$ that is greater than twice the maximum frequency $\lambda_l$ (target frequency) on the basis of the sampling theorem using the acquired maximum frequency $\lambda_l$ (target frequency), and determines a metrics measurement interval ($T_M$) on the basis of the frequency $\lambda_M = 1/T_M$. In other words, the metrics measurement interval determination unit 102 determines a reciprocal of the frequency $\lambda_M$ that is greater than twice the maximum frequency $\lambda_l$ (target frequency) as the metrics measurement interval ($T_M$) (step S12).

Note that, regarding the task execution amount (data transfer amount) collected for one month, if the data shows that the task execution amount (data transfer amount) tends to increase from the first week to the fourth week of that month, the metrics measurement interval determination unit 102 may calculate a 7-day moving average or the like and subtract it from the daily fluctuation data (execute high-pass filter processing).

Next, the power efficiency calculation interval determination unit 103 of the power efficiency calculation device 1 determines the power efficiency calculation interval ($T_A$) using the metrics measurement interval ($T_M$) determined by the metrics measurement interval determination unit 102 and the minimum executable interval ($T_c^{min}$) 121 stored in the storage unit 12 (see FIG. 1) (step S13).

Here, the power efficiency calculation interval determination unit 103 determines the power efficiency calculation interval ($T_A$) to be a value equal to or greater than the metrics measurement interval ($T_M$) ($T_M \leq T_A$). Furthermore, the power efficiency calculation interval determination unit 103 determines the power efficiency calculation interval ($T_A$) to be a value equal to or less than the minimum executable interval ($T_c^{min}$) 121 ($T_A \leq T_c^{min}$). In other words, the power efficiency calculation interval determination unit 103 determines the power efficiency calculation interval ($T_A$) such that $T_M \leq T_A \leq T_c^{min}$ are satisfied.

The processes from steps S10 to S13 are performed at the preliminary preparation stage.

Next, the processing at the operation stage is described. At this operation stage, the metrics collection unit 101 collects metrics (for example, the data transfer amount, power consumption, and the like) at the metrics measurement interval ($T_M$) determined by the metrics measurement interval determination unit 102 (step S14).

Then, the power efficiency calculation unit 104 of the power efficiency calculation device 1 calculates DCeP (power efficiency) at the power efficiency calculation interval ($T_A$) determined by the power efficiency calculation interval determination unit 103 using the metrics (the data transfer amount, power consumption, and the like) collected at the measurement interval ($T_M$) (step S15).

Note that the power efficiency calculation unit 104 calculates "useful work produced" (work output) using the above Equation (2). In addition, the power efficiency calculation unit 104 calculates "total energy consumed to perform that work" (power consumption amount) using the power consumption collected as metrics by the metrics collection unit 101 at the power efficiency calculation interval ($T_A$). Then, the power efficiency calculation unit 104 calculates power efficiency by dividing "useful work produced" (work output) by "total energy consumed to perform that work" (power consumption amount) using the above Equation (1).

Subsequently, the power efficiency control unit 105 executes predetermined power efficiency control according to the power efficiency calculation result calculated by the power efficiency calculation unit 104 (step S16).

For example, the power efficiency control unit 105 executes processing such as controlling a server with a small amount of packet transfer to sleep.

In this manner, the power efficiency calculation device 1 can appropriately determine a measurement interval of metrics and a calculation interval of power efficiency in accordance with demand fluctuations related to application use. Therefore, the power efficiency calculation device 1 can suppress power wastage and storage pressure caused by performing metrics collection processing and power efficiency calculation processing with excessive frequency, and can appropriately assess demand fluctuations of target applications.

<Hardware Configuration>

Figure 4:
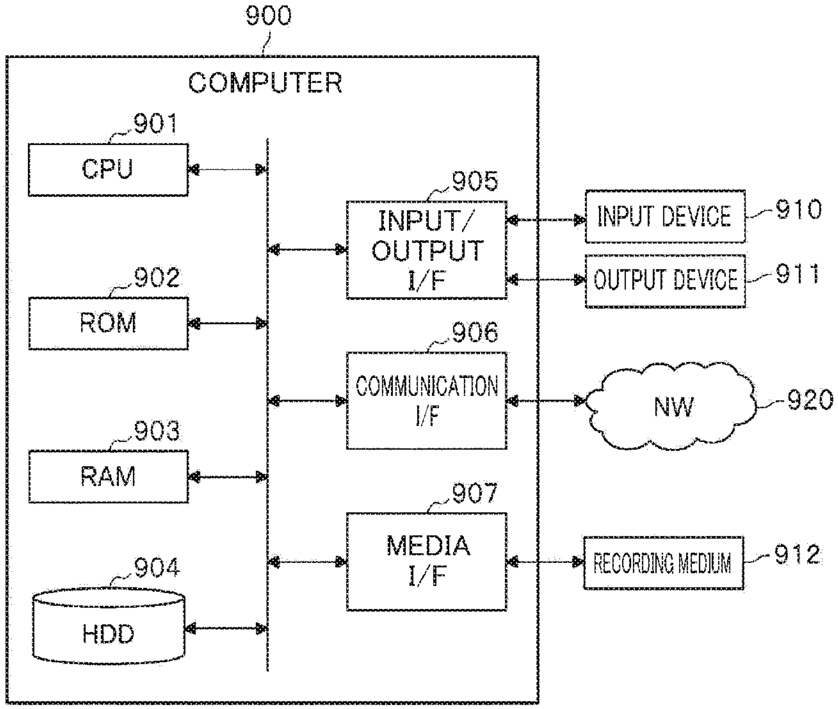
FIG. 4 is a hardware configuration diagram illustrating an example of a computer that implements functions of the power efficiency calculation device according to the present embodiment.
Figure 5:
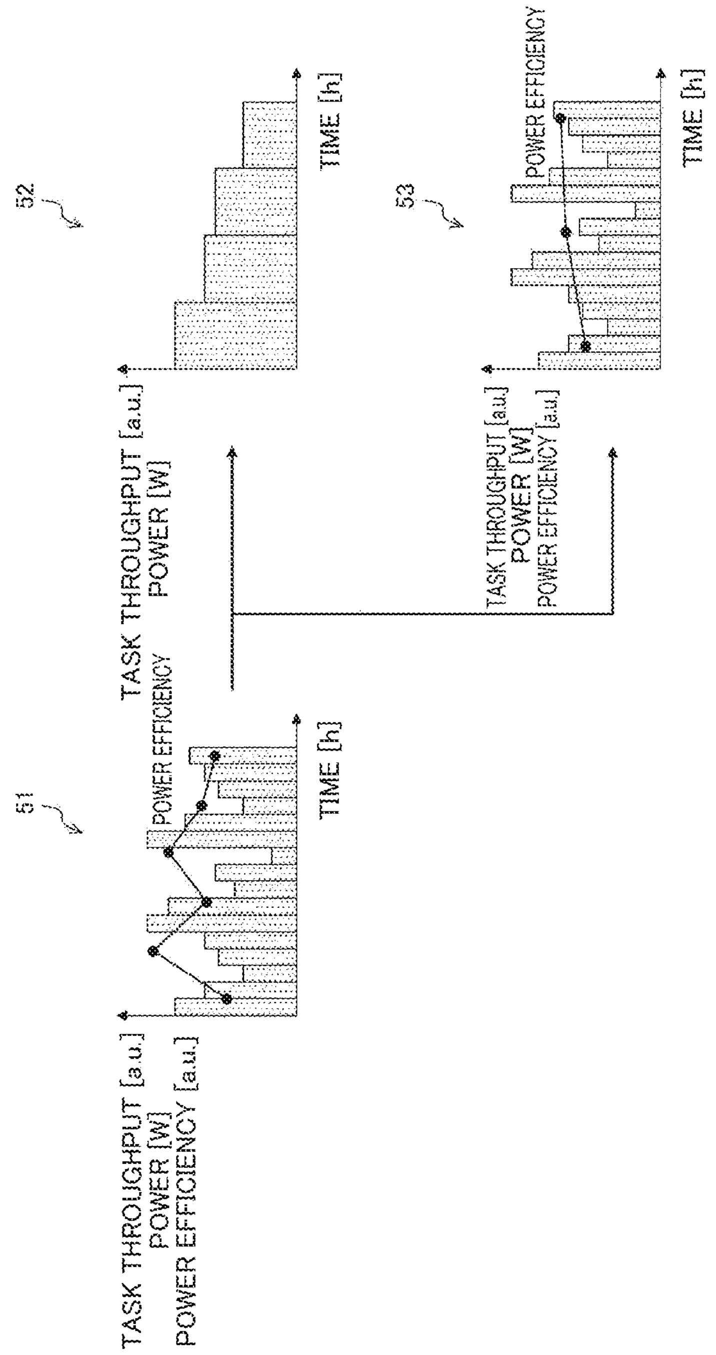
FIG. 5 is a diagram for describing a problem when the frequency of metrics measurement and the frequency of calculation of power efficiency are not set appropriately.

The power efficiency calculation device 1 according to the present embodiment is constructed by, for example, a computer 900 having a configuration as illustrated in FIG. 4.

FIG. 4 is a hardware configuration diagram illustrating an example of the computer 900 that implements functions of the power efficiency calculation device 1 according to the present embodiment. The computer 900 includes a central processing unit (CPU) 901, a read only memory (ROM) 902, a RAM 903, a hard disk drive (HDD) 904, an input/output interface (I/F) 905, a communication I/F 906, and a media I/F 907.

The CPU 901 operates on the basis of a program stored in the ROM 902 or the HDD 904 and performs control by the control unit 10 (FIG. 1). The ROM 902 stores a boot program executed by the CPU 901 when the computer 900 is started, a program related to hardware of the computer 900, and the like.

The CPU 901 controls an input device 910 such as a mouse or a keyboard, and an output device 911 such as a display or a printer through the input/output I/F 905. The CPU 901 acquires data from the input device 910 through the input/output I/F 905, and outputs generated data to the output device 911.

The HDD 904 stores a program executed by the CPU 901, data used by the program, and the like. The communication I/F 906 receives data from another device through a communication network (for example, a network (NW) 920), outputs the data to the CPU 901, and transmits data generated by the CPU 901 to other devices through the communication network.

The media I/F 907 reads a program or data stored in a recording medium 912 and outputs the program or data to the CPU 901 through the RAM 903. The CPU 901 loads a program related to desired processing from the recording medium 912 onto the RAM 903 through the media I/F 907, and executes the loaded program.

The recording medium 912 is an optical recording medium such as a digital versatile disc (DVD) or a phase change rewritable disk (PD), a magnetooptic recording medium such as a magneto-optical disk (MO), a magnetic recording medium, a semiconductor memory, or the like.

For example, when the computer 900 serves as the power efficiency calculation device 1 according to the present embodiment, the CPU 901 of the computer 900 implements the function of the power efficiency calculation device 1 by executing a program loaded onto the RAM 903. In addition, the HDD 904 stores data in the RAM 903. The CPU 901 reads the program related to the desired processing from the recording medium 912 and executes the program. In addition, the CPU 901 may read the program related to the desired processing from another device through a communication network (NW 920).

Effects

Hereinafter, effects of the power efficiency calculation device 1 and the like according to the present invention is described.

A power efficiency calculation device 1 according to the present invention is the power efficiency calculation device 1 that calculates power efficiency by executing the application 3 installed on the physical server group 30, the power efficiency calculation device 1 including: the metrics collection unit 101 that collects metrics, which are assessment indexes necessary for power efficiency calculation and include a task execution amount and power consumption of the physical server group 30, from the physical server group 30, and stores the metrics in the metrics collection DB 100 in the storage unit 12; the metrics measurement interval determination unit 102 that acquires the task execution amount stored in the metrics collection DB 100, extracts a change in the task execution amount in a predetermined time interval as a frequency component, and determines a metrics measurement interval using the extracted frequency; the power efficiency calculation interval determination unit 103 that determines, as a power efficiency calculation interval, an interval that is equal to or greater than the determined metrics measurement interval and equal to or less than the minimum executable interval 121 indicating a time from start to completion of power efficiency control; and the power efficiency calculation unit 104 that calculates the power efficiency in the power efficiency calculation interval determined by the power efficiency calculation interval determination unit 103 using the metrics collected by the metrics collection unit 101 in the determined metrics measurement interval.

In this manner, the power efficiency calculation device 1 can appropriately determine a measurement interval of metrics and a calculation interval of power efficiency in accordance with demand fluctuations related to application use. Therefore, the power efficiency calculation device 1 can suppress power wastage and storage caused by performing metrics collection processing and power efficiency calculation processing with excessive frequency, and can appropriately assess demand fluctuations of target applications.

Moreover, by systematizing a determination procedure of the metrics measurement interval and a determination procedure of the power efficiency calculation interval, the power efficiency calculation device 1 can automatically determine the metrics measurement interval and the power efficiency calculation interval to calculate the power efficiency.

Further, in the power efficiency calculation device 1, the metrics measurement interval determination unit 102 executes smoothing on the task execution amount acquired from the metrics collection DB 100, divides data for the smoothed task execution amount by predetermined time intervals, extracts frequency components at each time interval, acquires a maximum frequency among the extracted frequencies, and determines a reciprocal of a frequency that is greater than twice the maximum frequency as the metrics measurement interval.

In this manner, the power efficiency calculation device 1 can extract the change in the task execution amount as a frequency component, and determine the measurement interval of metrics on the basis of the maximum frequency among the extracted frequencies.

Thereby, the power efficiency calculation device 1 can determine a more appropriate measurement interval of metrics in accordance with the cycle of demand fluctuations. In other words, the power efficiency calculation device 1 can reproduce the cycle of demand fluctuation by measuring metrics, and can determine the measurement interval of metrics that does not result in excessive measurement frequency.

Note that the present invention is not limited to the embodiment described above, and various modifications can be made by a person of ordinary skill in the art within the technical idea of the present invention.

REFERENCE SIGNS LIST

1 Power efficiency calculation device
3 Application (App)
10 Control unit
11 Input/output unit
12 Storage unit
30 Physical server group
100 Metrics collection DB
101 Metrics collection unit
102 Metrics measurement interval determination unit
103 Power efficiency calculation interval determination unit
104 Power efficiency calculation unit
105 Power efficiency control unit
121 Minimum executable interval
1000 Power efficiency calculation system

The invention claimed is:

1. A power efficiency calculation device that calculates power efficiency by executing an application installed on a physical server group, the power efficiency calculation device comprising:

a metrics collection unit configured to collect metrics from the physical server group, the metrics being an assessment index necessary for power efficiency calculation and including a task execution amount and power consumption of the physical server group, and to store the metrics in a metrics collection DB in a storage unit;

a metrics measurement interval determination unit configured to acquire the task execution amount stored in the metrics collection DB, to extract a change in the task execution amount in a predetermined time interval as a frequency component, and to determine a metrics measurement interval using the extracted frequency;

a power efficiency calculation interval determination unit configured to determine, as a power efficiency calculation interval, an interval that is equal to or greater than the metrics measurement interval determined and equal to or less than a minimum executable interval indicating a time from start to completion of power efficiency control; and a power efficiency calculation unit configured to calculate the power efficiency in the power efficiency calculation interval determined by the power efficiency calculation interval determination unit using the metrics collected by the metrics collection unit the determined metrics measurement interval.

2. The power efficiency calculation device according to claim 1, wherein the metrics measurement interval determination unit is configured to:

execute smoothing on the task execution amount acquired from the metrics collection DB, divide data of the smoothed task execution amount by a predetermined time interval, extract components of frequency at each time interval, acquire a maximum frequency among the frequencies extracted, and determine a reciprocal of a frequency that is greater than twice the maximum frequency as the metrics measurement interval.

3. A power efficiency calculation method for a power efficiency calculation device for calculating power efficiency by executing an application installed on a physical server group, wherein the power efficiency calculation device executes:

a step of collecting metrics, which are assessment indexes necessary for power efficiency calculation and include a task execution amount and power consumption of the physical server group, from the physical server group, and storing the metrics in a metrics collection DB in a storage unit;

a step of acquiring the task execution amount stored in the metrics collection DB, extracting a change in the task execution amount in a predetermined time interval as a component of frequency, and determining a metrics measurement interval using the frequency extracted;

a step of determining, as a power efficiency calculation interval, an interval that is equal to or greater than the metrics measurement interval determined and equal to or less than a minimum executable interval indicating a time from start to completion of power efficiency control; and a step of calculating the power efficiency in the determined power efficiency calculation interval using the metrics collected at the metrics measurement interval determined.

4. A power efficiency calculation system comprising: a physical server group on which an application that executes one or more tasks is installed; and a power efficiency calculation device that calculates power efficiency by executing the application installed on the physical server group, wherein the power efficiency calculation device includes:

a metrics collection unit configured to collect metrics, which are assessment indexes necessary for power efficiency calculation and include a task execution amount and power consumption of the physical server group, from the physical server group, and store the metrics in a metrics collection DB in a storage unit;

a metrics measurement interval determination unit configured to acquire the task execution amount stored in the metrics collection DB, to extract a change in the task execution amount in a predetermined time interval as a component of frequency, and to determine a metrics measurement interval using the extracted frequency;

a power efficiency calculation interval determination unit configured to determine, as a power efficiency calculation interval, an interval that is equal to or greater than the determined metrics measurement interval and equal to or less than a minimum executable interval indicating a time from start to completion of power efficiency control; and a power efficiency calculation unit configured to calculate the power efficiency in the power efficiency calculation interval determined by the power efficiency calculation interval determination unit using the metrics collected by the metrics collection unit in the determined metrics measurement interval.

5. A non-transitory computer-readable storage medium storing a program for causing a computer to function as the power efficiency calculation device according to claim 1.

* * * * *